July 25, 1967   G. J. MASSAC   3,332,386

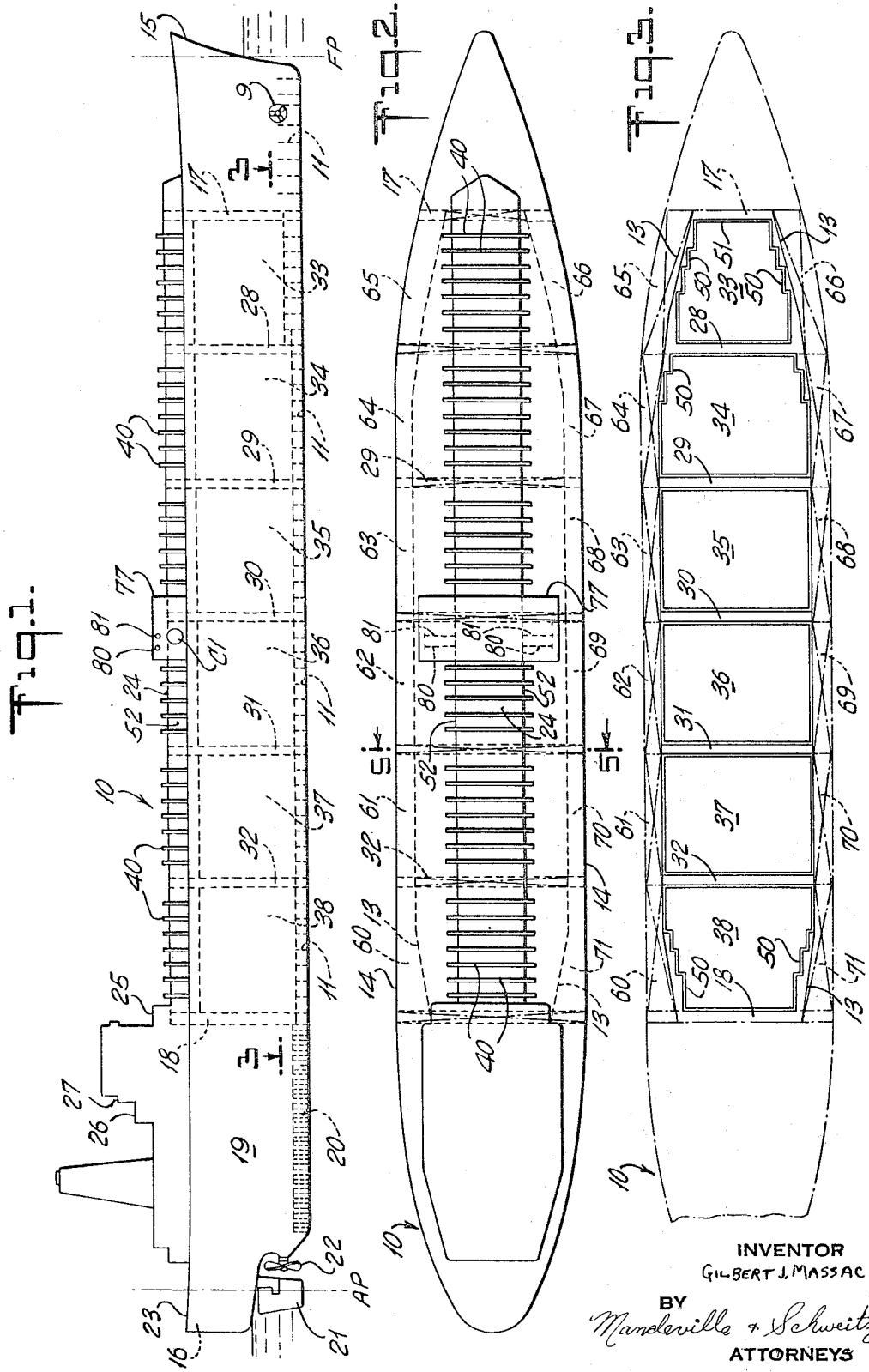

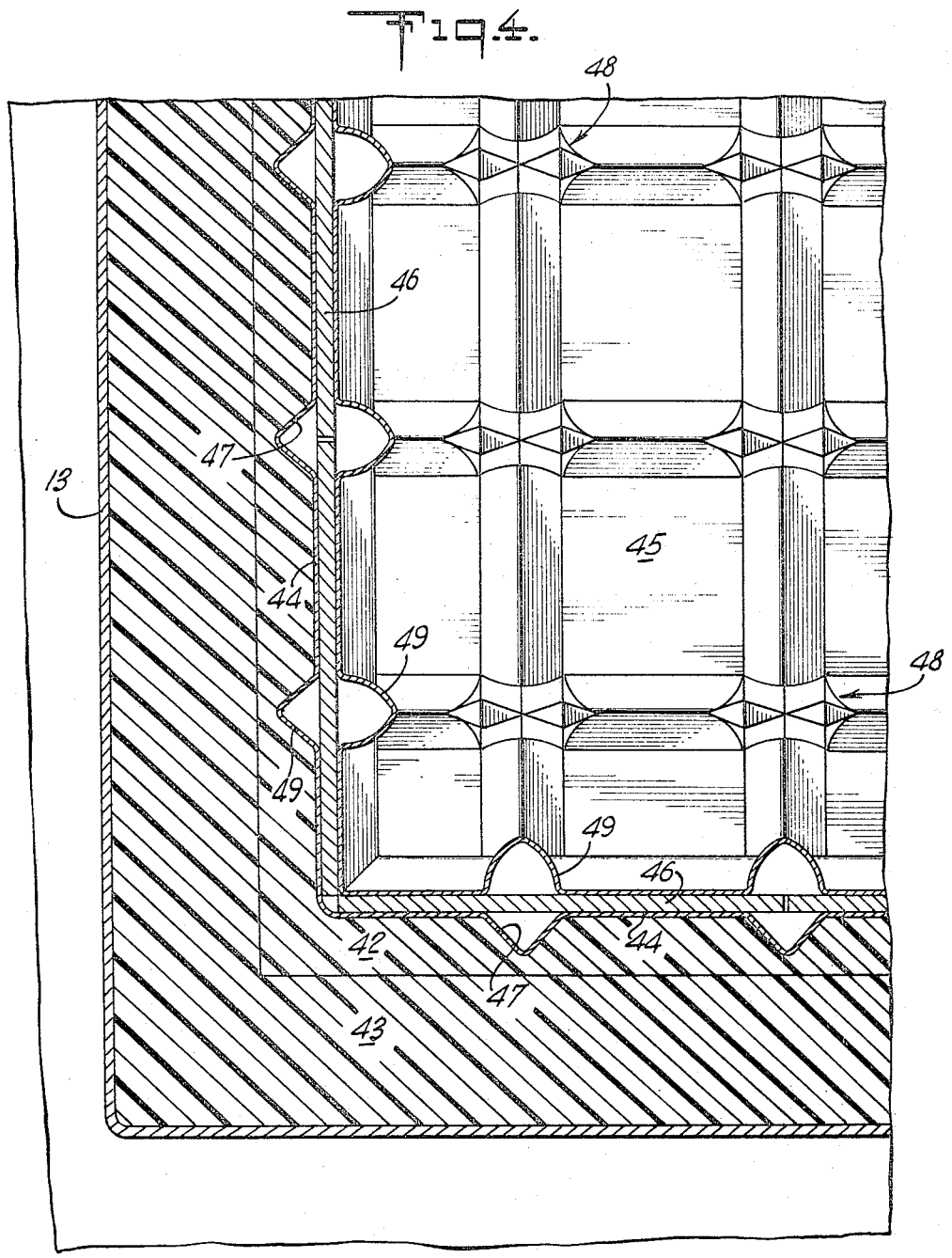

TANKER

Filed Oct. 28, 1965   3 Sheets-Sheet 3

INVENTOR
GILBERT J. MASSAC
BY
Mandeville & Schweitzer
ATTORNEYS

United States Patent Office 3,332,386
Patented July 25, 1967

3,332,386
TANKER
Gilbert J. Massac, Meudon, France, assignor to Technigaz, Paris, France, a corporation of France
Filed Oct. 28, 1965, Ser. No. 506,020
15 Claims. (Cl. 114—74)

The present invention relates to marine vessels used in the bulk transportation of liquefied natural gases while maintained at substantially atmospheric pressures and cryogenic temperatures.

The safe, efficient and economic storage and transportation of liquefied natural gas has presented numerous problems to shipbuilders, which are in a large measure due to the specific nature of the cargo itself. That is to say, the supercooled temperatures, for example, approximately −260° F. for liquefied methane at substantially atmospheric pressure, have necessitated the employment of special, impermeable insulating containers to prevent heat losses and ensuing vaporization of the cargo and to protect the ship structure itself from the potentially deleterious effects of the cryogenic cargo. The design of an economical, and relatively high speed, yet practical, tanker for carrying great amounts of liquefied natural gas in bulk, for example, as much as 250,000 barrels, has resulted in numerous departures from conventional tanker designs used in the transportation of fuel oil and other similar conventional liquid cargoes which are stored at ambient temperatures.

Heretofore, designs of liquefied natural gas (LNG) tankers have generally employed so-called independent "tanks" in which separate, self-supporting special steel or aluminum containers were incorporated into the cargo spaces of conventional tankers after the spaces or the tanks themselves had been thermally insulated. Alternatively, so-called "integrated" tank and insulation systems have been employed in which a cargo impermeable membrane and insulating panel members are supported directly by the ship structure in a predetermined array definitive of an insulated cryogenic cargo tank. It is to a tanker having an "integrated" cargo tank system that the present invention is directed.

Accordingly, it is an object of the present invention to provide an LNG tanker having an integrated cargo tank construction, which tanker will provide optimally maximum cargo carrying capacity commensurate with acceptable standards of seaworthiness, while being of a substantially low cost to build and to operate.

It is a further object to provide an LNG tanker of the type described having a new and improved barrier construction definitive of its integrated cargo tanks.

Another object of the invention is the provision of an improved, strengthened supporting structure and hull structure for trunked cryogenic cargo tanks of membrane construction.

A further object is to provide an improved shipboard cargo handling system to achieve speedy and efficient loading of cryogenic cargoes.

These and still further objects of the invention will become apparent by reference to the following detailed description of the new tanker, taken in conjunction with the accompanying drawings, in which:

FIG. 1 is a side elevational view of an LNG tanker embodying the principles of the invention;

FIG. 2 is a plan view of the tanker of FIG. 1;

FIG. 3 is a cross-sectional plan view of the tanker of FIG. 1 taken along line 3—3 thereof;

FIG. 4 is a fragmentary cross-sectional view of an integrated cargo tank showing details of construction;

Figure 5:
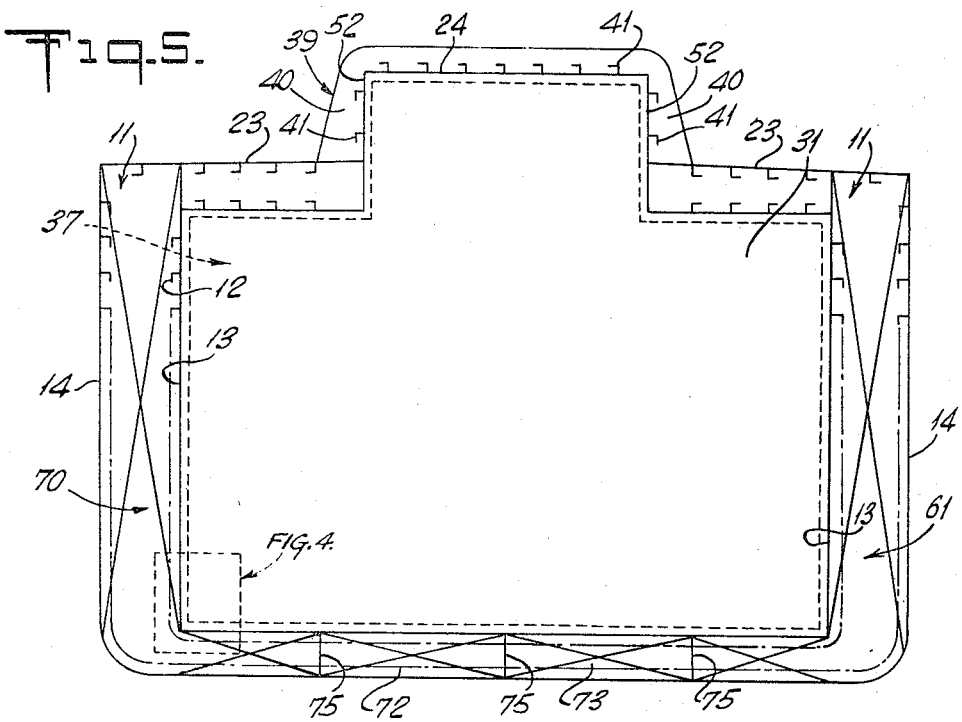
FIG. 5 is an enlarged, transverse cross-sectional view of the new tanker, taken along line 5—5 of FIG. 1.
Figure 6:
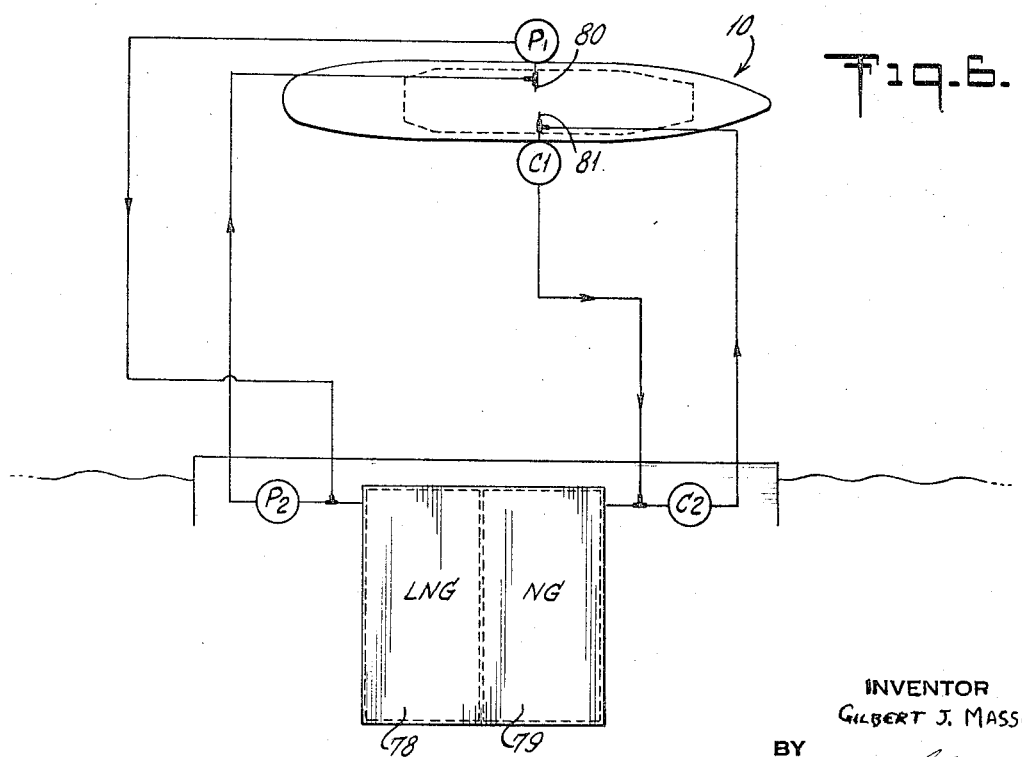
FIG. 6 is a schematic representation of the new and improved ship-shore cargo handling system of the present invention.

Referring now to the drawings, the new and improved LNG tanker 10 of the invention is of double hulled construction. Specifically, the hull of the tanker is established by a series of internal longitudinal and transverse steel framing members 11, 12, supporting spaced inner and outer hull plating which defines an inner hull 13 and an outer hull 14, as shown best in FIG. 5.

As an important aspect of the invention, the size of the hull is unusually great for vessels of this type. For example, in the illustrated exemplary embodiment of the new tanker, which is capable of carrying approximately 250,000 barrels of LNG having a specific gravity of 0.54, the principal hull data includes the following:

| | |
|---|---|
| Length overall (LOA) _____ft__ | 674 |
| Length between perpendiculars (LBP) _____ft__ | 640 |
| Beam, molded _____ft__ | 96 |
| Depth, molded to the main deck _____ft__ | 59¼ |
| Block coefficient _____ | 0.73 |

It should be understood that these dimensions and measures, as well as all dimensions and measures recited hereinafter, are given by way of example only, for the purposes of clear illustration and not as limitations upon the scope of the invention.

The bow and stern portions 15, 16, respectively, are of generally conventional configuration. As shown in the drawings, the bow portion 15 extends to a forwardmost cofferdam 17, a distance of approximately 79 feet aft of the forward perpendicular (FP), and includes a conventional fore peak tank and forward deep tanks (not shown). For increased maneuverability, a bow thruster 9 is included in the bow of the ship. The stern section 16 extends to an aftmost cofferdam 18, a distance of approximately 137 feet forward of the aft perpendicular (AP), and includes machinery space 19 for boilers, turbines, fuel tanks, steering gear, etc. Advantageously, the boilers are adapted to burn conventional fuel oil, as well as quantities of the LNG cargo which have been vaporized. Also included in the stern are the usual feed water tanks 20, rudder 21, and propeller 22. Above a main deck 23 of the hull, the topside silhouette includes a trunk deck 24, a control deck 25, a bridge deck 26, and a navigation bridge deck 27.

The midbody or cargo hold portions of the hull, that is, the portions included between the forwardmost and aftmost cofferdams 17, 18, are divided by intermediate cofferdams 28-32 into cargo tanks 33-38, each having a length between consecutive cofferdams of approximately 65 feet. The forwardmost and intermediate cofferdams 17 and 28-32 are of uniform length, approximately 4.5 feet, while the aftmost cofferdam 18 is slightly longer, approximately 6 feet. Thus, the cargo hold portions occupy the major portion (approximately 67%) of the length of the hull.

As shown in FIG. 5, the transverse section of the cofferdams includes a rectangular and relatively wide portion disposed below the main deck 23 and a narrow trunk portion extending above the main deck. As is customary, the cargo tanks are filled up into the trunk portions with LNG cargo when in service in order to reduce the size of the free liquid surface area of the cargo and to keep its associated unstabilizing free surface effects at substantially reduced and tolerable levels.

In accordance with the invention, the side walls of the cargo tanks 33-38 are generally defined by the inner hull structure, the cofferdam structure, and by an externally framed trunk structure 39. The transverse section of the cargo tanks will, of course, be similar to that of the cofferdams, giving the tank itself a relatively wide bottom and a narrow trunk. As will be understood, the cargo carrying capacity of the hull is maximized by the absence of longitudinal centerline bulkheads within the cargo space, enabling the exemplary illustrated hull structure to carry optimally large quantities of LNG cargo in its tanks 33–38.

More specifically, the trunk structure 39 of the tanker is supported by spaced, inverted U-shaped framing members 40 which are supported by the main transverse framing members 11 which extend inwardly to the trunk structure but terminate short of the ship centerline. The framing members 40 support plating definitive of the trunk deck 24 and the sides 52 of the trunk, which plating is externally stiffened by longitudinal framing members 41. The trunk sides 52 function as plate girders to support the main deck 23. It will be appreciated that this novel trunk structure strengthens the overall hull structure in an optimum manner while also defining the upper or trunked portions of the cargo tanks.

The cargo tanks are of "integrated" construction. That is to say, the structures which define the cargo tanks integrally support an insulated barrier construction comprising plastic insulating panels and special primary and secondary stainless steel sheets or membranes which provide a double liquid and vapor impermeable cargo barrier. As shown best in FIG. 4, the supoprting inner hull structure 13 is clad with layers of insulating foam panels 42, 43 of varying densities (the panels 42 being of greater density than the panels 43). Superimposed upon the thermal insulation, which advantageously is polyvinyl chloride foam, polyurethane foam, or polystyrene foam, is a new and improved multiple barrier construction consisting of spaced wafflelike stainless steel membranes 44, 45 of so-called bi-axially corrugated construction, having plywood panels 46 sandwiched therebetween. In accordance with the invention, universal joints 48, accommodative of bilateral displacements induced by the cryogenic temperatures of the LNG cargo, are included at the intersections of the corrugations 49 in the stainless steel membranes. The form and dimensions of the bi-axial corrugations 49, as well as the thickness of the membranes 44, 45, are chosen to assure good resistance to the forces of fatigue which may be induced by the variations in pressure of the liquid cargo caused by the motions of the ship in rough seas. As shown, the insulating panels 42 include recesses 47 in which the bi-axial corrugations 49 of the waffle-like membranes 44 are free to expand and contract.

This particular advantageous tank construction provides the thermal insulating properties required to safeguard the ship structure, of which it is an integral part, and to maintain an LNG cargo in its liquefied state at substantially atmospheric pressure. However, the above-described, desirable multiple barrier construction lends itself to insulation in flat planes only. Moreover, while it is theoretically possible for the planes of the tanks to intersect in other than right angles, it is necessary in the construction of all the corners of the tanks that the planes of the barrier panels 44, 45 meet at right angles in order to obtain joints in which the stresses of thermal, hydrostatic, or dynamic origins are sufficiently minimized to assure adequate resistance to fatigue under cyclic loading.

In accordance with the principles of the invention and as shown best in FIG. 3, the two forwardmost cargo tanks 33, 34, as well as the aftmost cargo tank 38, have convergently tapering, stepped horizontal profiles (in the horizontal plane) at narrowing, reduced sections of the hull in order to provide structures having high volumetric efficiencies and corner configurations of optimum strength. More specifically and as shown in the drawings, all of the surfaces of the cargo tanks are flat and intersect at 90° angles to accommodate proper installation and operation of the wafflelike, bi-axially corrugated cargo barrier construction. This is very important, since the barrier membranes are not optimally, effectively operative in other than the above-described flat, planar, perpendicularly intersecting configurations.

However, in order to maintain maximum strength in the hull structure, the contour of the inner hull 12 is maintained in substantial general conformity with that of the outer hull for that full length of cargo holds as shown in FIGS. 2 and 3, in accordance with the invention. Thus the inner walls of the wing tanks 60, 71 and 64–67 immediately adjacent the stepped tanks (the inner hull 13) do not conform to the shape of the longitudinal tank walls as is the case with the inner walls of the wing tanks 61–63 and 68–70. Therefore, the inner hull is not weakened by providing it with stepped interruptions, but it is maintained with a continuous or smooth, unstepped contour. Aside from strength considerations and in accordance with the inventive principles, the continuous inner hull configuration may be more easily constructed and may be made watertight without the introduction of welding problems.

In accordance with the invention, the requisite form for the stepped tanks 33, 34, 38 is provided by a supplemental stepped structure 50, definitive of the tank walls, which is supported by the smooth inner hull 13 at tapering portions thereof, as shown in FIG. 3. As will be understood, integral support of the membranes of the barrier construction in their proper right angularly intersecting relation is provided by the stepped structure 50 and the loads imposed upon the integrated barrier construction of the stepped cargo tanks will be transmitted to and borne by the double hulled structure as are the loads of the other cargo tanks 34–36. This novel arrangement of stepped cargo tanks and uniform ballast tanks provides maximum cargo carrying capacity in tapering portions of a vessel without sacrificing strength in the hull structure.

The ballast system of the new tanker includes twelve wing ballast tanks 60–71 and twelve bottom ballast tanks 72, 73, in addition to the seven transverse cofferdam tanks 17, 18, and 29–32. Specifically, the ballast tanks are adapted to be filled with a ballast medium (sea water) as the tanker discharges cargo and conversely to discharge the ballast medium as the ship takes on cargo. The wing ballast tanks 60–71 are substantially J-shaped in their transverse section and include leg portions extending adjacent the longitudinal sides of the cargo tanks and foot portions extending beneath the outermost portions of the cargo tanks. Extending from each of the wing tanks to the centerline of the ship are pairs of bottom tanks 72, 73, as shown clearly in FIG. 5. The longitudinal walls of the wing and bottom tanks are defined by the inner and outer hull plating, while the transverse end walls of the tanks as well as the vertical walls between adjacent tanks are defined by additional plating 75. It will be understood that the large number of ballast tanks (thirty-one in all) serves to minimize the free surface effects of the ballast liquids on board and thus contributes greatly to the desired positive stability (static) of the ship.

In service, the cargo tanks at all times include LNG and its vapor (NG) in varying amounts; i.e., when the cargo tanks are laden with LNG there are only small amounts of vapor (NG) present and, conversely, when the tanks are substantially empty (small residual amounts being left to maintain the tanks in a chilled down condition) there are relatively large amounts of vapor (NG) present and only a small amount of LNG. In the loading and/or discharging of cargo it is necessary, at all times, to keep the relationship between the LNG and the vapor properly balanced and to keep air excluded therefrom to prevent potentially explosive mixtures of cargo and air from being formed.

As another important aspect of the present invention, a new and improved cargo handling system is provided and includes a submerged pump P1 in each of the cargo tanks and a shipboard gas compressor C1 located at an LNG manifold platform 77. After the tanker is in service, LNG cargo is taken on board from the shore tanks 78 by pumping the LNG by means of a land pump P2 directly into the cargo tanks through main liquid discharge and filling lines 80 located on both the port and starboard sides of the ship.

In accordance with the invention, the shipboard compressor C1 enables the loading of LNG into the cargo tanks to be effected efficiently and in short order. Since the rate at which LNG can be loaded into the tank is dependent upon the rate at which the vapor (NG) is removed through a gas line 81, the rapid exhausting of NG by the shipboard compressor C1 allows the LNG to be pumped in at high rates. In the absence of the shipboard compressor C1, the rate of filling would be relatively slow and would depend upon the rate at which the LNG naturally displaces the vapor in the cargo tank.

When the cargo is subsequently unloaded from the tanker, the pumps P1 in each of the cargo tanks pump the LNG into a land based storage tank, while a shore based compressor C2 pumps in vapor (NG) from shore tank 79 to replace the LNG that is being pumped out. The necessity of maintaining the cargo tanks filled at all times with a combination of the cargo in its liquid and vapor state represents another of the many unique aspects of the handling of LNG cargoes in comparison with the handling of conventional cargoes.

In resume, the tanker construction of the present invention represents an improvement in vessels of this type. That is to say, the unique integrated tank construction, including cargo barriers fabricated from bi-axially corrugated stainless steel membranes sandwiched about plywood panels and superimposed upon multiple layers of foam insulation, is extremely safe, is very efficient, and is very economical to build and to maintain. Moreover, through the stepping of the side walls of the integrated tanks in general conformity with the convergent taper of the hull, the volumetric efficiency of an LNG tanker embodying bi-axially corrugated, wafflelike cargo barriers may be substantially optimized. It should also be appreciated that, the inverted U-shaped framing members of the new vessel, which define the trunked portions of the integrated cargo tanks, significantly strengthen the hull structure in a most efficient manner. A still further important aspect of the invention is the provision of a gas compressor on board an LNG tanker, as an integral part of the cargo handling system, to accelerate the exhausting of cargo vapor from the tanks when they are being filled with liquid cargo.

It should be understood that the specific tanker structure herein illustrated and described is intended to be representative only, as certain changes may be made therein without departing from the clear teachings of the disclosure. Accordingly, reference should be made to the following appended claims in determining the full scope of the invention.

What is claimed is:
1. A high capacity, high speed LNG tanker comprising
  (a) a hull structure including an inner and an outer hull having convergently tapered bow and stern portions,
  (b) deck means closing said inner hull,
  (c) a plurality of cofferdams dividing said closed inner hull into a plurality of cargo tanks,
  (d) the walls of said cargo tanks integrally supporting a thermally insulated, cargo impermeable membrane structure,
  (e) said thermally insulated, cargo impermeable membrane structure including a plurality of contiguously arrayed insulating panels supported by said hull structure and superimposed bi-axially corrugated stainless steel panels defining multiple liquid and vapor impermeable barriers, and
  (f) at least the forwardmost and aftmost of said cargo tanks having a right angularly stepped and generally tapering profile in the horizontal elevation in general conformity with the convergent taper of the bow and stern portions of said tanker.

2. A tanker for storing and transporting liquefied natural gases at substantially atmospheric pressures and cryogenic temperatures, comprising
  (a) an internally framed, double hulled structure of predetermined beam, depth, and length having convergently tapered bow and stern portions,
  (b) a plurality of cofferdams dividing the midbody portions of said structure into a plurality of cargo spaces,
  (c) an insulated, bi-axially corrugated membrane structure cladding said cargo spaces to form integrated cargo tanks,
  (d) at least one of the forwardmost and aftmost of said cargo tanks having a right angularly stepped and generally tapering profile in the horizontal elevation in general conformity with the convergent taper of the bow and stern portions of said tanker with which it is associated.

3. A tanker in accordance with claim 2, including
  (a) a plurality of ballast tanks formed between the inner and outer hulls of said double hulled structure adjacent and beneath said cargo tanks, all of said ballast tanks having substantially continuous longitudinal wall portions, and
  (b) supplemental structure means having a predetermined right angularly stepped contour definitive of the walls of said forwardmost and aftmost cargo tanks, and being directly supported by the inner hull at convergently tapered portions thereof,
  (c) said structural means supporting said bi-axially corrugated panels and transmitting the loads imposed thereupon to said double hulled structure.

4. An insulated cargo tank for liquefied natural gas including
  (a) a rigid support structure definitive of a closed cargo space,
  (b) a first layer of thermal insulating foam cladding said support structure,
  (c) a second layer of insulating foam superimposed upon said first layer,
  (d) said second layer defining recesses in a predetermined bi-axial pattern,
  (e) a secondary cargo barrier comprised of bi-axially corrugated, wafflelike membranes superimposed upon said secondary layer with the corrugations of said membranes disposed within said recesses,
  (f) a primary cargo barrier comprised of bi-axially corrugated, wafflelike membranes superimposed upon said secondary barrier and spaced therefrom by panel means sandwiched therebetween.

5. An insulated cargo tank in accordance with claim 4, in which
  (a) said rigid support is definitive of a cargo space having corners which meet only at substantially 90°.

6. An insulated cargo tank in accordance with claim 4, in which
  (a) said membranes are of stainless steel construction, and
  (b) said panel means sandwiched between said membranes are of plywood construction.

7. An insulated cargo tank in accordance with claim 4, in which
  (a) said insulating foam is selected from a group including polyvinyl chloride, polyurethane, and polystyrene.

8. An insulated cargo tank in accordance with claim 7, in which
  (a) said foam is clad to said support structure in the form of panels.

9. An insulated cargo tank in accordance with claim 8, in which
  (a) said foam of said second layer is of a greater density than the foam of said first layer.

10. A high capacity, high speed LNG tanker comprising
  (a) a hull structure including an inner and an outer hull having convergently tapered bow and stern portions,
(b) deck means closing said inner hull,
(c) a plurality of cofferdams dividing said closed inner hull into a plurality of cargo tanks,
(d) the walls of said cargo tanks integrally supporting a thermally insulated, cargo impermeable membrane structure,
(e) cargo filling and cargo discharge lines in communication with said cargo tanks,
(f) a first layer of thermal insulating foam cladding each of said tanks,
(g) a second layer of insulating foam superimposed upon said first layer,
(h) said second layer defining recesses in a predetermined bi-axial pattern,
(i) a secondary cargo barrier comprised of bi-axially corrugated, wafflelike membranes superimposed upon said secondary layer with the corrugations of said membranes disposed within said recesses,
(j) a primary cargo barrier comprised of bi-axially corrugated, wafflelike membranes superimposed upon said secondary barrier and spaced therefrom by panel means sandwiched therebetween,
(k) a gas compressor mounted on board said tanker, and
(l) said compressor being adapted to pump cargo gas out of said tanks when said tanks are being filled with liquid cargo.

11. A tanker for storing and transporting liquefied natural gases at substantially atmospheric pressures and cryogenic temperatures, comprising
(a) an internally framed, double hulled structure having convergently tapered bow and stern portions,
(b) a plurality of cofferdams dividing the midbody portions of said structure into a plurality of cargo spaces,
(c) said double hulled structure including a plurality of transverse hull framing members,
(d) a plurality of inverted U-shaped trunk framing members being supported by said hull framing members,
(e) plating externally supported by said trunk framing members and defining a trunk deck and sides of a trunk structure, and
(f) longitudinal framing members externally stiffening said plating,
(g) said sides of the trunk structure acting as longitudinal plate girders and supporting a main deck,
(h) said deck and said trunk structure closing said hull structure and said cargo spaces,
(i) a plurality of ballast tanks formed between the inner and outer hulls of said double hulled structure adjacent and beneath said cargo tanks,
(j) all of said ballast tanks having substantially continuous longitudinal wall portions,
(k) supplemental structural means being directly supported by the inner hull at convergently tapered portions thereof and providing the forwardmost and aftmost of said cargo spaces with a right angularly stepped and generally tapering profile in the horizontal elevation in general conformity with the convergent taper of the bow and stern portions of said tanker,
(l) all of said cargo spaces being clad by thermal insulation means defining at the innermost surfaces thereof a predetermined bi-axial pattern,
(m) a secondary cargo barrier comprised of bi-axially corrugated, wafflelike membranes superimposed upon said insulation means with the corrugations of said membranes disposed within said recesses, and
(n) a primary cargo barrier comprised of bi-axially corrugated, wafflelike membranes superimposed upon said secondary barrier and spaced therefrom by panel means sandwiched therebetween,
(o) said supplemental structural means supporting said bi-axially corrugated panels in the forwardmost and aftmost cargo spaces and transmitting the loads imposed thereupon to said double hulled structure.

12. A tanker in accordance with claim 11, in which
(a) said insulation means comprises inner and outer layers of foam material,
(b) the density of said inner layer is greater than the density of said outer layer.

13. A tanker in accordance with claim 11, in which
(a) said membranes are of stainless steel construction, and
(b) said panel means sandwiched between said membranes are of plywood construction.

14. A tanker in accordance with claim 12, in which
(a) said insulating foam is selected from a group including polyvinyl chloride, polyurethane, and polystyrene.

15. A tanker in accordance with claim 11, which includes
(a) a gas compressor mounted on board said tanker, and
(b) said compressor is adapted to pump cargo gas out of said cargo spaces when they are being filled with liquid cargo.

References Cited

UNITED STATES PATENTS

| | | | |
|---|---|---|---|
| 2,963,873 | 12/1960 | Stowers | 114—74 X |
| 3,021,808 | 2/1962 | Henry | 114—74 |
| 3,067,713 | 12/1962 | Meesen | 114—74 |
| 3,150,794 | 9/1964 | Schlumberger et al. | 220—9 |
| 3,213,632 | 10/1965 | Valk et al. | 114—74 X |

MILTON BUCHLER, *Primary Examiner.*

T. M. BLIX, *Assistant Examiner.*